United States Patent

Hornung et al.

[11] Patent Number: 6,160,475
[45] Date of Patent: Dec. 12, 2000

[54] LIGHTING DEVICE IN THE DOOR OF A VEHICLE

[75] Inventors: Heinz Hornung, Kirchentellinsfurt; Thomas Jaiser, Kirchentellsinfurt; Bern Merz, Frickenhausen; Anton Kempf, Tuebingen; Klaus-Peter Fessler, Gomaringen, all of Germany

[73] Assignee: Sidler GmbH & Co., Tuebingen, Germany

[21] Appl. No.: 09/312,862

[22] Filed: May 17, 1999

[30] Foreign Application Priority Data

May 21, 1998 [DE] Germany ............ 198 22 636

[51] Int. Cl.[7] ................ B60Q 1/00; G09F 9/00
[52] U.S. Cl. ............ 340/461; 340/458; 362/488; 362/501; 362/806; 307/10.8
[58] Field of Search .................. 340/461, 458, 340/438; 362/806, 802, 488, 501, 252, 800; 307/10.1, 10.8

[56] References Cited

U.S. PATENT DOCUMENTS

| | | | |
|---|---|---|---|
| 4,670,819 | 6/1987 | Boerema et al. | 362/80 |
| 4,788,630 | 11/1988 | Gavagan | 362/80 |
| 4,972,173 | 11/1990 | Raciti | 340/472 |
| 5,077,643 | 12/1991 | Leach | 362/183 |
| 5,174,643 | 12/1992 | Priesemuth | 362/61 |
| 5,193,895 | 3/1993 | Naruke et al. | 362/80 |
| 5,434,757 | 7/1995 | Kashiwagi | 362/80 |

FOREIGN PATENT DOCUMENTS

| | | |
|---|---|---|
| 41 01 418 C2 | 12/1993 | Germany . |
| 195 24 602A1 | 1/1997 | Germany . |
| 195 34 410A1 | 3/1997 | Germany . |
| 297 19 025 U1 | 12/1997 | Germany . |
| 59-8546 | 1/1984 | Japan . |

OTHER PUBLICATIONS

"Vom Beleuchtungssystem zum Innenraummodul" by Trentmann et al. in ATZ Automobiltechnische Zeitschrift 99 (1997) 11.

*Primary Examiner*—Daniel J. Wu
*Assistant Examiner*—Toan Pham
*Attorney, Agent, or Firm*—Paul Vincent

[57] ABSTRACT

A lighting device comprises at least one door light (4) provided in a door (2) of a vehicle, the light source of which (6) is disposed behind a wall (7) of a door covering, in particular a trim (3), wherein the outer side of the wall (7) is formed, in this region (8), by a light-permeable decorative layer (10) which has a surface pattern when the light source (6) is switched off corresponding to the remaining surface decor of the wall (7). The light-permeable decorative layer (10) is introduced onto a transparent plastic (13) using the IMD method. It is thereby possible to impart an arbitrary surface design to the light-permeable decorative layer (10).

5 Claims, 1 Drawing Sheet

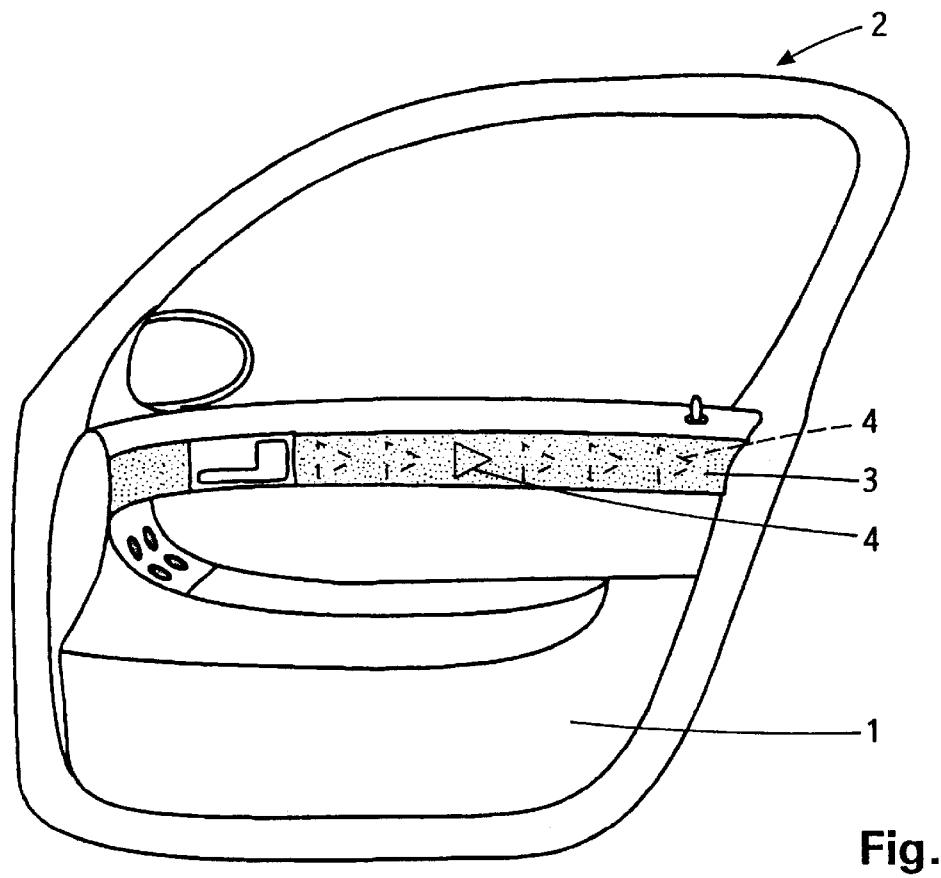
Fig. 1
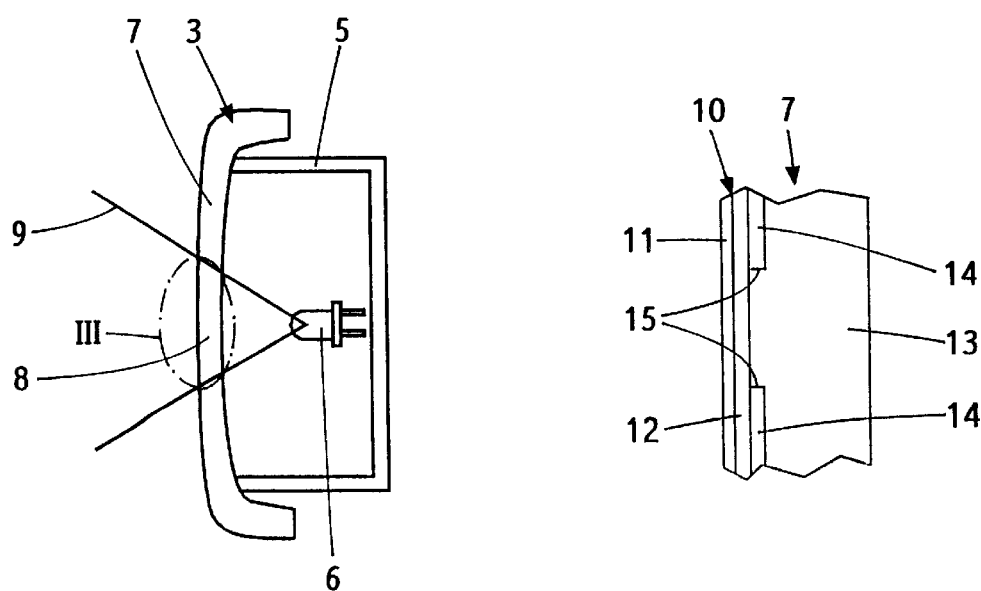
Fig. 2
Fig. 3

LIGHTING DEVICE IN THE DOOR OF A VEHICLE

BACKGROUND OF THE INVENTION

The invention concerns a lighting device with at least one door light provided in the door of a vehicle, the light source of which is disposed behind a wall of a door cover, in particular a trim, wherein the outer side of the wall in this region is formed by a light permeable decorative layer the surface decoration of which corresponds to that of the wall when the light source is switched off.

A lighting device of this kind is e.g. known in the art through DE 195 24 602 A1.

A door light having a red cover plate is often provided in the door covering or in the door frame of a motor vehicle having a red illumination region when the door is opened to warn traffic coming from the rear of a dangerous location (open door). In addition, the light from this door light can be used to illuminate the ground proximate the vehicle. Due to the colored cover plate, the lighting device is often recognizable by the occupants when the vehicle door is closed. In addition, the colored light cover plate normally does not fit into the design concept of the door and of the inner covering of the door. In addition, the static light does not produce the optimal warning effect.

The above mentioned DE 195 24 602 A1 discloses a trim covering member for the inner compartment of a motor vehicle consisting essentially of a transparent material along its entire front surface facing into the inner compartment of the vehicle. An illumination device is disposed in the cavity formed between the front side of the hollow shell-shaped trim piece and the door covering, which is only activated when the door is opened. The background behind the trim covering is dark so that the trim covering is not distinguishable from other trim covering portions within the inner compartment of the motor vehicle not having a lighting configuration when the lighting configuration is switched-off. A proper coloring or pattern on the transparent material of the trim covering components allows this component to be individually adapted to the remaining trim covering components provided in the inner compartment of the motor vehicle for the inner decor. However, a coloration or pattern given to the transparent material (decorative layer) cannot always be identically matched to the surface decoration of the remaining trim covering components.

It is therefore the purpose of the present invention to improve a lighting device of the above mentioned kind in such a fashion that the light permeable decorative layer can be given an arbitrary surface design.

SUMMARY OF THE INVENTION

This purpose is achieved in accordance with the invention in that the light permeable decorative layer is introduced onto a transparent plastic using the IMD procedure.

In the IMD (In Mold Decoration) procedure, an opaque plastic is usually injection molded onto the back of a printed support foil (decorative layer) to produce injection molded components having differing surface designs (wood structure, metallic effects, coloring etc.). The light irradiated by the at least one light source can shine through the transparent plastic as well as through the decorative layer.

A back of the decorative layer can thereby be coated with a layer which is light-impermeable except for the regions permeable to the at least one light source. This can, e.g. be a painted layer the edge shapes of which define the light-permeable region with regard to form, as an arrow, point etc. When the door light is switched off, this form is not visible and only the decor of the door covering can be recognized.

The door covering can be provided either on the outer side or on the inner side of the motor vehicle door. In the latter case, the door light automatically illuminates as soon as the vehicle door is opened to warn the following traffic.

In a preferred embodiment of the invention, the light-permeable region in front of the light source has a symbol shape, in particular in the form of an arrow or a point to amplify the warning effects for following traffic.

In highly preferred embodiments of the invention, the lighting device has at least two door lights disposed next to each other. Preferentially, the at least two door lights or their light sources are electrically controlled sequentially in such a fashion that, e.g. an outwardly travelling running light is created. Alternatively, a constant light or a synchronized blinking light is possible. Running lights and blinking lights substantially amplify the signalling effect of the door light with regard to the following traffic.

The lighting device described can be used in accordance with the invention as a warning light or to illuminate the ground to protect the occupants of the vehicle when getting out of the vehicle, e.g. to prevent them from stepping into a puddle.

Further advantages of the invention can be derived from the description and the drawing. The above mentioned features and those to be described below can each be utilized in accordance with the invention individually or collectively in arbitrary combination. The embodiments shown and described are not to be considered exhaustive enumeration, rather have exemplary character only for illustration of the invention.

BRIEF DESCRIPTION OF THE DRAWING

FIG. 1 shows the inner side of a vehicle door having a trim integrated into the light device in accordance with the invention;

FIG. 2 schematically shows a cut representation of the trim shown in FIG. 1 in the vicinity of the light source of the lighting device; and FIG. 3 is an enlarged view of a detail of a trim corresponding to cut III of FIG. 2.

DESCRIPTION OF THE PREFERRED EMBODIMENT

FIG. 1 shows the inner side 1 of the door 2 of a motor vehicle on which a trim 3 is disposed. Six door lights 4 are integrated into this trim 3 which can not be recognized when switched off and which shine through the trim 3 when switched on. In FIG. 1, the five "dashed" door lights 4 are not illuminated, and only the third door light 4 from the left is in the illuminated state (solid lines).

As shown in FIG. 2, the trim 3 is introduced onto a U-shaped member 5 of the vehicle door 2 which is not permeable to light. Each door light 4 has one or more light diodes (LEDs) as light sources 6 the light of which passes through the wall 7 of the trim 3 at the region 8. The light cone passing through the wall 7 is indicated with 9.

The multi-layer construction of the trim 3 and its wall 7 is shown in FIG. 3. The outer side of the wall 7 facing the inner compartment of the vehicle is formed by a light-permeable decor layer 10 which, for its part, is formed from two layers having an outer light-permeable painted covering layer 11 and a painted layer 12 having a corresponding decor or design (wood structure, metallic effects, colorings etc.). A light-impermeable intermediate layer 14 (e.g. a painted layer) is provided between the decorative layer 10 and the plastic 13 except for the region directly before the light source 6, the edge contours 15 of which determine the arrow-shape of the door light 4 or of the illuminated region 8 as shown in FIG. 1. The decorative layer 10 and the intermediate layer 14 are introduced onto the transparent plastic 13, e.g. using the IMD method. Since the wall 7 has a uniform surface decor, the door light 4 is only visible in the illuminated state.

The six door lights 4 shown in FIG. 1 are preferentially controlled sequentially in such a fashion that a running light is produced having light travelling in the arrow direction, i.e. in the outer direction when the motor vehicle door 2 is opened. This running light substantially increases the signalling effect of the light device.

We claim:

1. A lighting device for installation on a door of an inner compartment of a vehicle, the device comprising:

a light source disposed within the door;

a transparent plastic wall covering said light source, said transparent plastic wall having a first surface facing said light source and a second surface facing an outer surface of the door;

a light impermeable layer disposed on said second surface of said transparent plastic wall, said light impermeable layer having an opening for passing light from said light source; and a light permeable layer disposed on and covering said light impermeable layer, said light permeable layer completing an outer surface of said lighting device bordering the inner compartment of the vehicle, wherein said light impermeable layer and said light permeable layer are injection molded onto said transparent plastic wall using an IMD method, wherein said lighting device has a surface decor matching other surface decor of the door when said light source is switched off.

2. The lighting device of claim 1, wherein said opening in said light-irermeable layer is spaced as a symbol.

3. The lighting device of claim 1, wherein said light source comprises at least two door lights disposed next to each other, and further comprising means for electrically controlling said door lights to form at least one of a blinking light and a running light.

4. A method for warning drivers of vehicles, the method comprising the steps of:

a) installing a light source within a door of the vehicle;

b) preparing a transparent plastic wall for covering said light source, said transparent plastic wall having a first surface for facing said light source and a second surface for facing an outer surface of the door;

c) IMD injection molding a light impermeable layer on said second surface of said transparent plastic wall, said light impermeable layer having an opening for passing light from said light source;

d) IMD injection molding a light permeable layer on and covering said light impermeable layer, said light permeable layer completing an outer surface of said lighting device bordering an inner compartment of the vehicle, wherein said lighting device has a surface decor matching other surface decor of the door when said light source is switched off;

e) covering said light source with said transparent plastic wall, said light impermeable layer, and said light permeable layer following step d); and f) controlling a switching of said light source to warn drivers of following vehicles.

5. A method for warning drivers of vehicles, the method comprising the steps of:

a) installing a light source within a door of the vehicle;

b) preparing a transparent plastic wall for covering said light source, said transparent plastic wall having a first surface for facing said light source and a second surface for facing an outer surface of the door;

c) IMD injection molding a light impermeable layer on said second surface of said transparent plastic wall, said light impermeable layer having an opening for passing light from said light source;

d) IMD injection molding a light permeable layer on and covering said light impermeable layer, said light permeable layer completing an outer surface of said lighting device bordering an inner compartment of the vehicle, wherein said lighting device has a surface decor matching other surface decor of the door when said light source is switched off;

e) covering said light source with said transparent plastic wall, said light impermeable layer and said light permeable layer following step d), wherein said light source is disposed in the door for at least one of ground illumination and inner compartment illumination.

* * * * *